(12) United States Patent
Baker

(10) Patent No.: US 11,197,224 B1
(45) Date of Patent: Dec. 7, 2021

(54) SYSTEMS AND METHODS FOR ROUTING MESSAGES THROUGH WIRELESS NETWORKS

(71) Applicant: Synapse Wireless, Inc., Huntsville, AL (US)

(72) Inventor: William R. Baker, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 15/899,211

(22) Filed: Feb. 19, 2018

(51) Int. Cl.
| | |
|---|---|
| *H04W 40/12* | (2009.01) |
| *H04W 28/02* | (2009.01) |
| *H04L 12/721* | (2013.01) |
| *H04W 40/00* | (2009.01) |
| *H04W 84/18* | (2009.01) |

(52) U.S. Cl.
CPC .......... *H04W 40/12* (2013.01); *H04L 45/123* (2013.01); *H04W 28/021* (2013.01); *H04W 40/005* (2013.01); *H04W 84/18* (2013.01)

(58) Field of Classification Search
CPC .............. H04L 45/123; H04W 28/021; H04W 40/005; H04W 40/12; H04W 84/18
See application file for complete search history.

(56) References Cited

U.S. PATENT DOCUMENTS

| | | | | |
|---|---|---|---|---|
| 7,184,421 B1 * | 2/2007 | Liu | ....................... | H04L 12/189 370/254 |
| 7,970,871 B2 * | 6/2011 | Ewing | .................... | G01D 21/00 702/104 |
| 8,934,492 B1 | 1/2015 | King et al. | | |
| 9,160,633 B1 | 10/2015 | Ruble et al. | | |
| 9,619,989 B1 * | 4/2017 | Ewing | ................... | G08B 21/245 |
| 9,655,215 B1 * | 5/2017 | Ho | ...................... | H05B 37/0272 |
| 2002/0167895 A1 * | 11/2002 | Zhu | .......................... | H04J 3/085 370/216 |
| 2006/0092913 A1 * | 5/2006 | Joseph | .................... | H04L 45/08 370/351 |
| 2006/0280131 A1 * | 12/2006 | Rahman | .................. | H04L 45/02 370/256 |
| 2008/0031155 A1 * | 2/2008 | Korus | ..................... | H04L 63/20 370/254 |
| 2008/0225717 A1 * | 9/2008 | Chen | ...................... | H04W 28/02 370/235 |
| 2008/0253298 A1 * | 10/2008 | Bhatti | ..................... | H04L 45/02 370/252 |

(Continued)

*Primary Examiner* — Asad M Nawaz
*Assistant Examiner* — Kai Chang
(74) *Attorney, Agent, or Firm* — Maynard Cooper & Gale, P. C.; Jon E. Holland

(57) ABSTRACT

A wireless mesh network has a coordinator that is configured to determine a topology of the network and define, based on the topology, a plurality of routes through the network. For each route, the coordinator is configured to assign a plurality of nodes to the route. Each of the nodes assigned to the route is configured to receive messages and wirelessly retransmit messages that include a route identifier that identifies the route. Since messages are forwarded through the network based on route identifiers, it is unnecessary for the nodes to maintain conventional routing tables and to broadcast route discovery messages in order to learn routes for populating the routing tables with route data, thereby reducing network traffic and congestion.

25 Claims, 5 Drawing Sheets

(56) References Cited

U.S. PATENT DOCUMENTS

| | | | |
|---|---|---|---|
| 2008/0298239 A1* | 12/2008 | Anand | H04L 45/02 370/235 |
| 2010/0074163 A1* | 3/2010 | Banks | H04L 1/1867 370/315 |
| 2010/0157889 A1* | 6/2010 | Aggarwal | H04L 45/125 370/328 |
| 2010/0220653 A1* | 9/2010 | Hwang | H04L 45/24 370/328 |
| 2011/0134797 A1* | 6/2011 | Banks | H04W 40/246 370/254 |
| 2013/0034031 A1* | 2/2013 | Sherman | H04W 40/26 370/310 |
| 2013/0107768 A1* | 5/2013 | Murakami | H04W 40/10 370/310 |
| 2014/0213191 A1* | 7/2014 | Courtice | H04W 40/12 455/67.11 |
| 2014/0226566 A1* | 8/2014 | Soneda | H04W 40/02 370/328 |
| 2015/0369618 A1* | 12/2015 | Barnard | H05B 37/0272 701/491 |
| 2016/0006837 A1 | 1/2016 | Reynolds et al. | |
| 2016/0094398 A1* | 3/2016 | Choudhury | H04L 45/42 370/254 |
| 2016/0100440 A1* | 4/2016 | Emord | H04W 76/18 370/329 |
| 2016/0192272 A1* | 6/2016 | Wang | H04W 40/02 370/329 |
| 2017/0003736 A1* | 1/2017 | Turon | H04L 12/2816 |
| 2017/0091889 A1* | 3/2017 | Chen | G06Q 50/265 |
| 2017/0359190 A1* | 12/2017 | Nadathur | H04L 12/2803 |
| 2018/0054772 A1* | 2/2018 | Tan | H04W 76/10 |
| 2018/0213460 A1* | 7/2018 | Adella | H04W 40/24 |
| 2018/0302807 A1* | 10/2018 | Chen | H04L 45/22 |
| 2019/0141701 A1* | 5/2019 | Soyak | H04W 16/10 |

\* cited by examiner

SYSTEMS AND METHODS FOR ROUTING MESSAGES THROUGH WIRELESS NETWORKS

RELATED ART

In many wireless networks, nodes often must find routes for communicating messages. Each node typically has a routing table that indicates the next hop for a unicast message communicated by the node depending on the message's destination. Routes though the network are discovered from time-to-time so that routing tables can be appropriately updated.

In order to discover routes through the network, route discovery messages are often broadcast among the nodes, thereby increasing network traffic and congestion. As more nodes are added to a network, the traffic associated with route discovery can increase dramatically, particularly for nodes involving mobile nodes for which new routes may need to be discovered or otherwise identified as nodes move. Congestion from route discovery messages and other types of traffic can significantly degrade network performance, and techniques for reducing congestion and increasing network performance are generally desired.

In order to help alleviate network congestion, some network designers have utilized multicast messaging for communicating payload data rather than unicast messaging, thereby obviating the need to communicate route discovery messages through the network in the hopes of reducing congestion. However, multicast messaging can be inefficient and unreliable, and in many cases, multicast messaging schemes often increase network congestion since at least some multicast messages may propagate across a greater area of the network than what is actually required to deliver the message to its desired destination or destinations.

Moreover, better techniques for managing traffic flow within networks are generally desired in order to reduce congestion and increase network performance.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
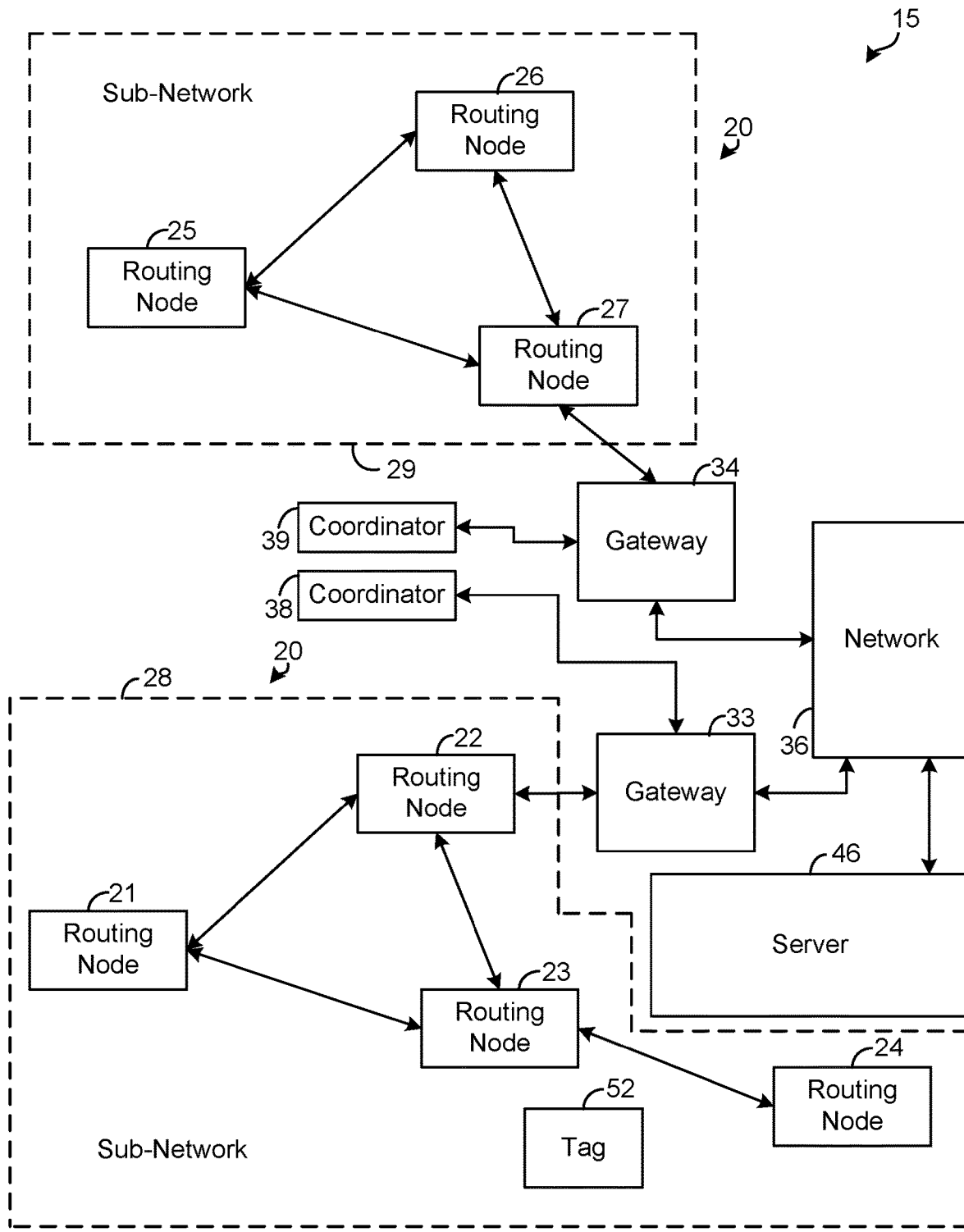
FIG. 1 is a block diagram illustrating an exemplary embodiment of a system for tracking assets.

The present disclosure generally pertains to systems and methods for routing messages through wireless networks. In some embodiments, the systems and methods may be utilized for wireless networks of asset tracking systems that are used to track mobile assets, but the systems and method of the present disclosure may be used for other types of networks as may be desired. In one exemplary embodiment, a network (e.g., a wireless mesh network or other type of network) has one or more coordinators configured to discover a topology of the network and to define and maintain routes for messaging with nodes of the network. The coordinator may determine the topology of the network by discovering nodes and the links between the nodes and, based on the discovered nodes and links, may identify paths, also referred to herein as "routes," through the network for routing messages. Each route passes through a subset of the nodes, and the coordinator communicates with each node along the route for assigning the node to the route so that it is aware of its presence within the route. When a unicast message is to be communicated through the network, a route identifier identifying the route leading to the message's destination is inserted into the message and used by the nodes to forward the message through the network so that the message travels along the identified path to its destination. Each node that receives the message is configured to determine whether such node is assigned to the route identified by the message's route identifier and, if so, to forward the message. Thus, only nodes assigned to the identified route should forward the message as it propagates so that the message travels along a defined route through the network.

By assigning nodes to routes through a coordinator, as described herein, it is unnecessary for the nodes to maintain conventional routing tables and to communicate traditional route discovery messages for updating such routing tables, thereby reducing network traffic. That is, centralizing route discovery at a coordinator on behalf of the nodes of the network and then assigning the nodes to the identified routes can significantly reduce the overall messaging that is performed for route discovery, thereby reducing network congestion, relative to an embodiment where route discovery is performed at each individual node with the use of conventional routing tables.

A coordinator of the system may monitor topology of the network over time and update routes of the network as conditions change. As an example, when a node leaves the network, the coordinator may select one or more other nodes to take its place on routes to which it was assigned by assigning one or more other nodes to such routes. The coordinator may also assign nodes that join the network to existing routes or may define new routes to accommodate new nodes. Also, as more nodes join the network, the coordinator may rearrange or redefine the routes in order to enable more optimal communication through the network. In some embodiments, the coordinator may be configured to rearrange or redefine the routes based on other changes to network topology, such as link quality.

FIG. 1 depicts an exemplary embodiment of a system 15 for monitoring assets as they move through an environment. As shown by FIG. 1, the system 15 comprises a wireless sensor network (WSN) 20 having a plurality of nodes 21-27. In one exemplary embodiment, the nodes 21-27 are stationary and shall be referred to hereafter as "routing nodes," but any of the nodes 21-27 may be mobile in other embodiments. FIG. 1 depicts seven routing nodes 21-27 for simplicity, but the network 20 may have any number of routing nodes 21-27 in other embodiments. In one exemplary embodiment, the network 20 is implemented as a mesh network, but other types of networks may be implemented in other embodiments. Exemplary networks are described in commonly-assigned U.S. Pat. No. 7,970,871, entitled "Systems and Methods for Dynamically Configuring Node Behavior in a Sensor Network, and filed on May 2, 2008, which is incorporated herein by reference.

Each routing node 21-27 is able to communicate with any of the other routing nodes 21-27. In one exemplary embodiment, the routing nodes 21-27 communicate among one another wirelessly, but it is possible for any of the routing nodes 21-27 to communicate with any of the other routing nodes 21-27 over a conductive medium or otherwise. Messages may hop from routing node-to-routing node in order to reach a destination. For example, in the exemplary embodiment shown by FIG. 1, the routing nodes 21-23 are within range of each other such that any of the routing nodes 21-23 can communicate directly with any of the other routing nodes 21-23. However, the routing node 24 is only within range of routing node 23. The other routing nodes 21, 22 can use the routing node 23 to route or otherwise transmit a message to the routing node 24. In one exemplary embodiment, each routing node 21-27 may have a route identifier r that includes identifiers of routes to which it is assigned. As described further herein, route identifiers can be assigned, created and updated via a variety of techniques. In some embodiments, a coordinator communicates with nodes of the network 20 to determine the topology of the network, define routes and determine link quality associated with the routes. The coordinator may discover routes from a point in the network to one or more destinations and select a route that is most efficient, such as having fewest hops or highest link quality for communicating messages. The coordinator may update routes by assigning and reassigning nodes (e.g., routing nodes) to routes along the route. The routing nodes along a route may be used to route a message to any destination along the route.

As known in the art, a unicast message is a message that is routed to a particular destination identified by the message. In this regard, each unicast message typically includes a source address indicating the network address of the node from which the message originated and a destination address indicating the network address of the node that is to receive the message. Traditionally, a unicast message also includes a next-hop address identifying the next node that is to receive the message as it is progressing toward its destination. The next hop information is generally retrieved from routing tables that are maintained by the network nodes. However, as will be described in more detail hereafter, a unicast message communicated by the network 20 of FIG. 1 may include a route identifier in lieu of a next-hop address, thereby obviating the need to define and maintain traditional routing tables. A unicast message generally hops through the network, node-by-node, until the message reaches its identified destination.

Multicast messages, on the other hand, are not forwarded based on routing tables but are instead rebroadcast by nodes that receive it. In this regard, each multicast message includes a source address indicating the network address of the node from which the message originated. Rather than having a destination address identifying a single destination node, a multicast message often has a group identifier identifying a group of nodes that are to receive and process the message. One type of message, referred to as a "broadcast" message, is to be processed by all of the nodes that receive it. Generally, each node that receives the multicast message retransmits the multicast message so that it can be heard by the other nodes within range of the transmitting node. Thus, the multicast message should eventually reach each node within the identified multicast group. The multicast message has a time-to-live (TTL) value that is decremented each time it is retransmitted, and the nodes stop retransmitting the multicast message once this value falls below a threshold. Such practice eventually stops propagation of the multicast message so that it is not retransmitted in perpetuity. If desired, parameters (e.g., time-to-live value and multicast group identifier) in the header of a multicast message can be set such that the multicast message reaches each node of the network 20 or any group of nodes within the network 20, such as at least the routing nodes of a particular sub-network. If desired, a multicast message may have a destination address or group identifier identifying a single node. In such case, the message is rebroadcast through the network 20, and the node identified as the message's destination or group further processes the message as may be desired, whereas the other nodes that receive the message only retransmit the message.

In some embodiments, unicast messages sent through the network 20 may include a route identifier that identifies the route that the message is to follow to reach its destination. When a node receives a message, it reads the route identifier and consults a route identifier table at the node. As indicated above, the route identifier table includes the route identifier of each route to which the node is assigned. If the node is assigned to the route indicated by route identifier, the node retransmits the message so that it can be received by at least the next node along the identified route. This next node on the route receives the message and similarly processes it to determine whether to retransmit it. Any node that receives the message and is not assigned to the identified route (e.g., does not have the route identifier stored in its route identifier table) discards the message without retransmitting it. Thus, the message is only retransmitted by nodes assigned to the identified route so that the message should propagate from node-to-node along the identified route until the message reaches its destination node. Thus, the message may be forwarded to each node on the identified route sequentially, and it is unnecessary for each node to ascertain a next hop address from the message. Instead, routing information for the message comprises the route identifier, which the node can look up in its route identifier table to determine whether to retransmit the message.

In some embodiments, the system 15 may include a coordinator configured to monitor the topology of the network and to dynamically assign nodes to routes. The coordinator can be implemented in various ways, but in some embodiments, the coordinator is implemented in a combination of hardware and software and can include various logic configured to achieve the functionality described herein. In an embodiment, the coordinator is located in a hardware enclosure shared by one or more nodes of the network, such as a gateway 33, 34, but the functionality ascribed to the coordinator may be allocated to one or more of various other resources of the system 15 in other embodiments. Note that, although the various examples and discussion herein are generally focused on embodiments in which a coordinator is located within or coupled to a gateway 33, 34, a coordinator can be implemented in or coupled to any or various combinations of nodes. In some embodiments, coordinators may synchronize operations, such that functionality described as performed by a coordinator herein may be shared among one or more additional coordinators.

As illustrated by FIG. 1, the routing nodes 21-27 may be arranged in groups, referred to herein as "sub-networks." FIG. 1 shows two sub-networks 28, 29, but any number of sub-networks is possible. In particular, the sub-network 28 includes routing nodes 21-24, and the sub-network 29 includes routing nodes 25-27. Each sub-network 28, 29 has a respective gateway 33 or 34 through which the routing nodes of the sub-network communicate in order to access a network 36, such as a local area network (LAN) or wide area network (WAN). In the embodiment shown by FIG. 1, each gateway 33, 34 is communicatively coupled to network 36. As an example, in one embodiment, the network 36 employs Internet Protocol (IP), and each gateway 33 and 34 encapsulates messages received from its respective sub-network in accordance with an applicable IP protocol for communication through the network 36. If desired, a gateway 33. 34 may de-encapsulate the messages received from the WSN 20 or alternatively encapsulate both payload and overhead (e.g., a header) of the received messages for transmission through the network 36. In the opposite direction, each gateway 33, 34 de-encapsulates messages from the network 36 to recover packets for communication through the WSN 20. If the recovered data is already compatible with the protocol of the WSN 20, a gateway 33, 34 may simply transmit the recovered data to a routing node of its respective sub-network. Otherwise, the gateway 33, 34 may encapsulate the recovered data in accordance with the protocol of the WSN 20.

Note that routing nodes 21-27 of the different sub-networks 28, 29 are members of the same WSN 20, and a routing node of one sub-network may reach a routing node of another sub-network. However, one sub-network may be located in a geographic region outside of the range of routing nodes in another sub-network such that direct communication between the two sub-networks is not possible. In such case, messages may pass through the network 36 or other type of network. As an example, the routing node 22 may transmit a message through the gateway 33, network 36, and gateway 34 to the routing node 27. In one embodiment, a gateway 33, 34 is coupled to the WSN 20 and configured to manage traffic between sub-networks. In this regard, a gateway 33, 34 and may function as one of the nodes of the WSN 20 such that messages may be routed through the gateways 33, 34.

A coordinator may be coupled to either of the gateways 33 or 34 or located elsewhere in the system 15. As will be described in more detail hereafter, each coordinator 38, 39 is configured to coordinate routing within its respective sub-network 28, 29. In one embodiment, the coordinators 38, 39 are provisioned to know the network configuration (e.g. "topology"), including the network addresses of the routing nodes and other nodes of the WSN 20. In other embodiments, each of the coordinators 38, 39 may be configured to dynamically learn the network configuration. Each coordinator 38, 39 may be configured to implement a topology discovery process to learn the network topology.

There are various techniques that a coordinator can use to learn or otherwise determine the topology of the network 20. In one exemplary embodiment, a coordinator from time-to-time polls each node of its respective sub-network 28, 29 by transmitting a message, referred to herein as "polling message." When a routing node, referred to in this example as the "polled node," receives a polling message, the polled node transmits a one-hop multicast message (or other type of message) that should be heard by each node, referred to in this example as "responding node," that is one hop away or in other words within the direct communication range of the polled node. Each such responding node measures the link quality between itself and the polled node, such as for example, the received signal strength of the one-hop multicast message, and responds to the one-hop multicast message with a reply that includes the network address of the responding node and the information indicative of the link quality for the wireless link between the responding node and the polled node.

The polled node is configured to store the network address and associated link quality of each responding node that responded to the one-hop multicast message in a table, referred to herein as "neighbor table." Thus, the neighbor table stored at the polled node indicates the network address of each routing node that is within direct communication range (i.e., one hop away) of the polled node, and the neighbor table indicates the link quality of the link between such routing node and the polled node. The polled node is configured to transmit the neighbor table to its coordinator in response to the original polling message from the coordinator, thereby informing the coordinator of which routing nodes are one hop from the polled node. Thereafter, the coordinator may similarly poll each of the other routing nodes (e.g., the neighbor nodes identified by the neighbor table) in the same manner to build a complete topology of the network. In other embodiments, other techniques for learning or otherwise determining the topology of the network 20 are possible.

In one exemplary embodiment, the network 36 may be the Internet or other known communication network. Messages are communicated between the server 46 and the WSN 20 and between sub-networks 28, 29 via the network 36. In one exemplary embodiment, transmission control protocol/Internet protocol (TCP/IP) is used for such communication, but other protocols and network types are possible in other embodiments. The system 15 may further include at least one server 46. The server 46 may be in communication with nodes of the WSN 20 via network. The server 46 may be implemented by a combination of hardware and software (e.g., include software running on at least one processor) and, if desired, may implement a node of the network 20 such that it may communicate with any of the other nodes of the network 20 in accordance the protocol used by the nodes 21-27. In addition the server 46 may comprise other communication interfaces for receiving various information about nodes of the network, including information from sensors or other information. The server 46 may be configured to use information received to track nodes of the network 20 such as based on messaging from network nodes, sensors, GPS information, or other data indicative of a node's location. The server 46 may be configured to provide such information for use by one or more coordinators in performing the various tasks ascribed to coordinators described herein.

As shown by FIG. 1, the system 15 comprises at least one mobile node 52, referred to herein as a "tag," that is configured to wirelessly communicate with the routing nodes 21-27 as the tag 52 is moved through the environment or other location at which the routing nodes 21-27 are situated. The server 46 monitors mobile tags based on information that may be communicated to the server 46 through the networks 20, 36, and the server 46 may use the networks 20, 36 to communicate information, such as commands, to the tag 52.

In one exemplary embodiment, the tag 52 is attached to an asset (e.g., a person or object) to be monitored in order to track movements of the asset, as will be described in more detail hereafter. In one exemplary embodiment, the tag 52 is a node of the WSN 20, but it is not configured to route messages through the WSN 20. That is, the tag 52 may transmit a network message to a routing node 21-27 for communication of the message through the WSN 20. Also, messages identifying the tag 52 are communicated through the WSN 20 such that they are received by the tag 52. However, the tag 52 does not serve as an intermediate hop for messages that do not identify it, including multicast messages. Preventing the tag 52 from performing routing functions helps to conserve the tag's power. In this regard, not only are the tag's functions reduced, but the tag may sleep from time-to-time while the routing nodes 21-27 remain operational for routing functions.

As an example, from time-to-time, the tag 52 may be configured to transition to a sleep state in which components of the tag 52 are deactivated so that the tag 52 consumes less power. In particular, the tag's communication components may be deactivated such that the tag 52 is unable to communicate with external devices while in a sleep state. If desired, the tag 52 may be configured to periodically awaken from its sleep state, briefly communicate with at least one routing node 21-27 so that its location can be discovered and information can be exchanged for a brief period of time, and then transition back to a sleep state. Thus, the tag 52 can be configured to spend a significant amount of time in a sleep state such that the useful life of the tag's batteries is significantly extended. Exemplary techniques for performing asset tracking and network communication are described in commonly-assigned U.S. Pat. No. 9,619,989, entitled "Asset Tracking Systems and Methods," which is incorporated herein by reference.

Figure 2:
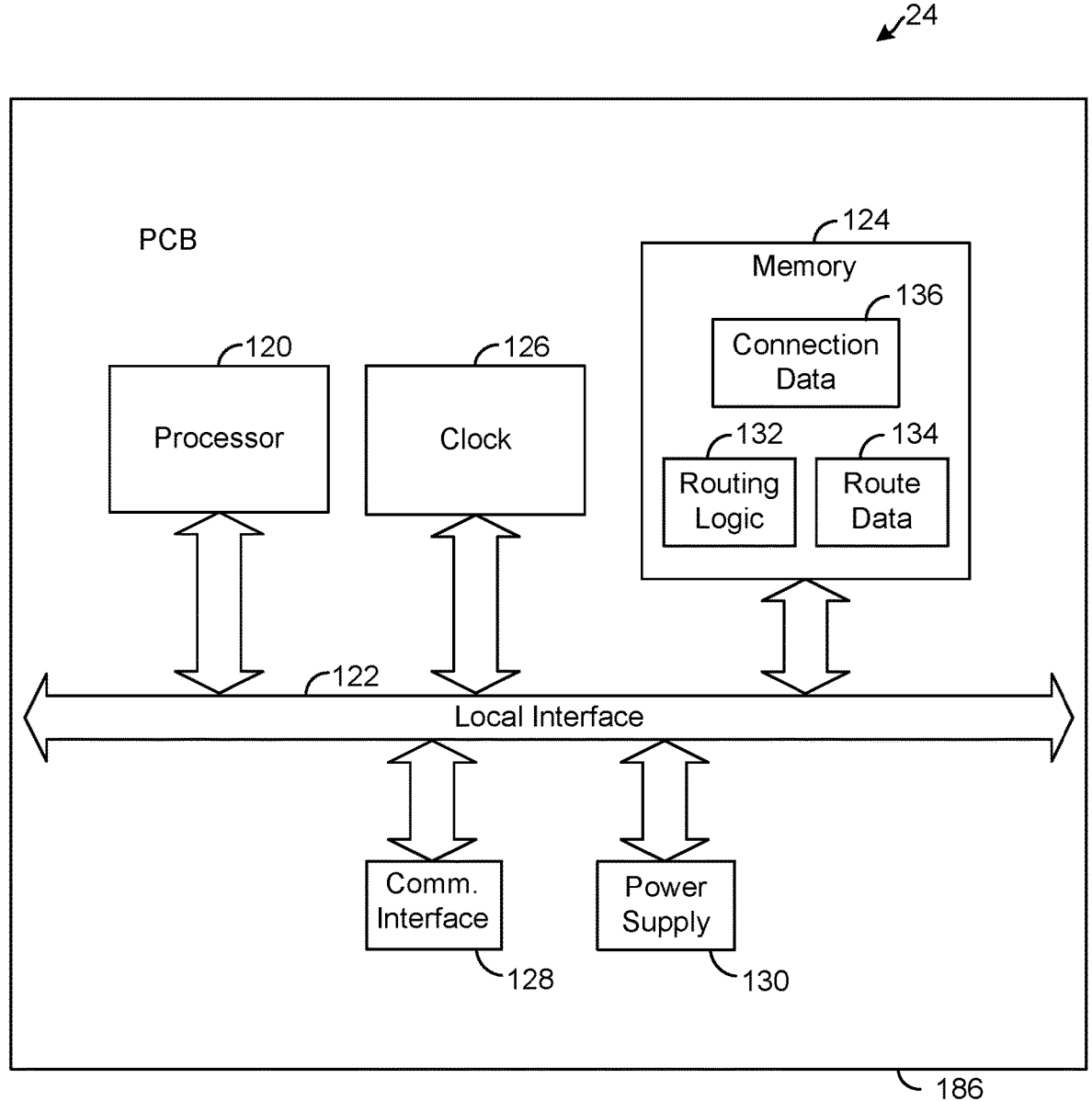
FIG. 2 is a block diagram illustrating an exemplary embodiment of a network node, such as is depicted by FIG. 1.

FIG. 2 depicts an exemplary embodiment of one of the routing nodes 24. Note that any of the other routing nodes 21-23 and 25-27 may be configured similarly to or identically to the routing node 24 depicted by FIG. 2. The exemplary routing node 24 shown by FIG. 2 comprises logic 132, referred to herein as "routing logic," which may be implemented in software, firmware, hardware, or any combination thereof. In FIG. 2, the routing logic 132 is implemented in software and stored in memory 124. However, other configurations of the logic 132 are possible in other embodiments.

Note that the routing logic 132, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The exemplary embodiment of the routing node 24 depicted by FIG. 2 includes at least one conventional processor 120, which comprises processing hardware for executing instructions stored in the memory 124. As an example, the processor 120 may comprise a central processing unit (CPU) or a digital signal processor (DSP). The processor 120 communicates to and drives the other elements within the routing node 24 via a local interface 122, which can include at least one bus. The routing node 24 has a clock 126, which can be used to track time, such as time between polling messages received from its gateway, elapsed time since the node has sent a route discovery message to identify new nodes or gateways, or otherwise.

The routing node 24 also has routing logic 132, route data 134 and connection data 136 stored in memory 124. The routing logic 132 may be configured to generally handle routing functions of the node 24, as described in further detail below. The route data 134 may include information indicative of routes to which the node 24 is assigned. As an example, the route data 134 can include a table, referred to herein as "route identifier table" or "route ID table," that stores route identifiers for the routes that have been assigned to the node 24 by its coordinator 38. The information for the route data 134 may be provided to the node 24 by its coordinator 38.

The connection data 136 may be indicative of identifiers of other nodes of the network 20 that are neighbors of the node 24. As used herein, a "neighbor" of a node, refers to another node that is within direct communication range of the node. That is, a node's neighbor is within one hop of the node so that a message communicated between the node and its neighbor does not need to pass through any other node. As an example, the connection data 136 may define a neighbor table that includes identifiers of nodes that respond to a one-hop multicast message sent by the node 24 in response to a polling message from a coordinator, as described above. The route data 134 and connection data 136 may include various other information, and the node 24 may store other data and logic in memory in other embodiments.

The routing node 24 also has a communication interface 128 that comprises a radio frequency (RF) radio or other device for communicating wirelessly. The communication interface may comprise various components, such as components for communicating with other routing nodes, gateways, or tags. As an example, the communication interface 128 may be used for communicating messages between the routing node 24 and the gateway 33 (FIG. 1). The communication interface 128 may also be used for communicating network messages that hop through the routing node 24. The communication interface 128 also may include components for communicating with devices in or near the same vicinity as the routing node 24, including devices that move about the environment, such as the tags 52. Other components for communicating via communication interface 128 may be possible in some embodiments.

The routing node 24 has a power supply 130, which provides electrical power to the components of the routing node 24. In one exemplary embodiment, the power supply 130 has an interface that allows it to plug into or otherwise interface with an external component, such as a wall outlet or battery, and receive electrical power from such external component. If desired, the power supply 130 may comprise one or more batteries so that interfacing with an external power component is unnecessary.

Although not specifically shown by FIG. 2, in some embodiments the routing node 24 may comprise a plurality of sensors, such as a magnetic sensor, a temperature sensor, a light sensor, a humidity sensor, a pressure sensor, or otherwise. The sensors may individually sense samples indicative of respective measurements and store the samples in memory 124 at the routing node 24. Data indicative of the samples taken by the sensors may be transmitted to other nodes, one or more coordinators, or to server 46 for processing.

In one exemplary embodiment, each component shown by FIG. 2 resides on and is integrated with a printed circuit board (PCB) 186. However, in other embodiments, other arrangements of the routing node 24 are possible.

The routing logic 132 may be configured to perform various aspects of messaging as described herein. In some embodiments, the routing logic 132 is configured to receive messages from various nodes of the network, determine a route identifier associated with the message, and determine whether to wirelessly retransmit the message based on the route identifier. Exemplary configurations of routing nodes and techniques for network communication are described in commonly-assigned U.S. Pat. No. 8,204,971, entitled "Systems and Methods for Dynamically Configuring Node Behavior in a Sensor Network" and filed on May 24, 2011, which is incorporated herein by reference.

In addition to performing routing functions for various messages, the routing node 24 may be configured to notify nodes that it has joined the network and participate as a member of one or more routes to which it may be assigned by a coordinator. In some embodiments, the routing logic 132 may be configured to select a gateway for use in communicating messages to the server 46 or other component in communication with the network 36. After selecting a gateway, the routing logic 132 may communicate its selection to the gateway so that the gateway is aware of the nodes that have selected it for network communication. For illustrative purposes, assume that the nodes 21-24 of sub-network 28 have selected gateway 33 and nodes 25-27 have selected gateway 34.

Note that there are various techniques that may be used by the routing logic 132 to select gateway 33. As an example, the gateways 33, 34 may communicate multicast messages that are received by the node 24. Based on a time-to-live (TTL) value in each multicast message, the routing logic 132 may determine a number of hops from the node 24 to the gateway from which the multicast message originated. In this regard, the number of hops may be equal to the number of times that the TTL value was decremented by a routing node before being received by the node 24. In some embodiments, the routing logic 24 may be configured to select the gateway associated with the lowest number of hops.

In some embodiments, the gateway selected by a node is configured to perform various control functions for that node, such as maintenance and software or firmware updates. As an example, when a software update is to be pushed to the network nodes, the server 46 or other component may send the update to the gateways 33, 34, and each of the gateways 33, 34 may then communicate with each node in its respective sub-network 29, 30 to push the update to such node.

In some embodiments, selection of a gateway by a node has the effect of also selecting which coordinator 38, 39 is responsible for coordinating the routes assigned to such node. As an example, the coordinator 38 may reside at the location of the gateway 33, be coupled to the gateway 33, or in communication with the gateway 33 so that a path through the gateway 33 is efficient for the coordinator 38 to communicate with the nodes 21-24 of the sub-network 28. In such embodiment, the coordinator 38 may be separate node of the network 20 or the gateway 33 may be a node through which the coordinator accesses the network 20. In some embodiments, the coordinator 38 may be integrated with the gateway 33. As an example, portions of the coordinator 38 may be implemented in software and share hardware resources (e.g., one or more processors) with software of the gateway 33.

When the gateway 33 receives notice from a node that it has been selected by such node for network communication, the gateway 33 may inform the coordinator 38 associated with the gateway 33, and based on such notice, the coordinator 38 may begin coordinating routes for the node (e.g., assign the node to routes, as described herein). In other embodiments, the coordinator 38 may be at other locations and is not necessarily associated with a particular gateway. As an example, the coordinator 38 may reside at any node of the network 20 as may be desired.

As described above, a coordinator may be configured to poll from time-to-time the routing nodes for which it is responsible for coordinating routing that the coordinator can accurately track the topology of the network 20 as it changes. Thus, in the example for which the coordinator 38 coordinates routes for the node 24, the node 24 can receive polling messages from the coordinator 38 from time-to-time. As an example, the coordinator 38 may be configured to poll the nodes of the sub-network 28 according to a predefined polling interval. In response to a polling message, the node 24 can wirelessly transmit a one-hop multicast message. Any neighbor node that hears the multicast message responds by transmitting a reply to the node 24. The reply can include network address of the neighbor node so that the node 24 can determine that the neighbor node heard the multicast message, and the reply may also include information about link quality (e.g., the received signal strength (RSSI) of the multicast message at the neighbor node). For each reply received by the routing node 24, the routing logic 132 may update the neighbor table of the connection data 136 with the network address of the neighbor that transmitted the reply and the associated link quality information. In response to the polling message, the routing logic 132 may also transmit the neighbor table to its coordinator 38, which can use the information to build and maintain (e.g., update) the network topology as further described herein.

The routing logic 132 of the node 24 may be further configured to monitor a length of time between polling messages from its coordinator 38, such as based on elapsed time measured by clock 126. For example, the logic 132 may monitor messages to determine whether the amount of time since the last polling message exceeds a predefined threshold. If the threshold is exceeded without receiving a new polling message, the routing logic 132 may determine that the coordinator 38 is no longer able to communicate with the node 24. In such case, the routing logic 32 may be configured to cause the node 24 to stop retransmitting messages for routes assigned by the coordinator 38. As an example, the routing logic 32 may erase the route identifiers received from the coordinator 38 and stored in its route ID table of the routing logic 132 so that the node 24 does not retransmit messages for routes identified by the deleted route identifiers.

In this regard, a failure to receive a polling message from the coordinator 38 within an expected time period may indicate that the coordinator 38 is no longer coordinating routes. In such an event, routes may be broken, such as when one or more routing nodes leave the network 20, and the coordinator 38 may not be coordinating the routes in order to compensate for or fix the broken routes. Thus, attempts to communicate along the broken routes may result in messages for the broken routes never reaching their destinations but still increasing network traffic. By preventing the node 24 from forwarding messages along the routes managed by a coordinator 38 that has not provided a timely polling message, the routing logic 132 can eliminate further transmission of traffic being communicated by routes that are no longer being coordinated.

In addition, when the time since the last polling message exceeds the predefined threshold, the routing logic 132 may search for a new coordinator. As an example, in an embodiment for which selection of a coordinator is based on selection of a gateway, the logic 132 may be configured to use the techniques described above to select a new gateway for network communications and, hence, a new coordinator for route coordination. In other embodiments, other techniques may be used to finding a new coordinator for the node's route management.

The node 24 can function as a member of each route assigned to it by the coordinator 38, and disregard messages identifying other routes of which it is not a member. As noted above, a node 24 may receive route identifiers indicating routes to which it is assigned by the coordinator 38 and may store these route identifiers in the route ID table of the route data 134. When the node 24 receives a message, the logic 132 may determine whether a route identifier in the message matches a route identifier for one of the routes of which the node is a member, as indicated by the node's route ID table. If the logic 132 determines that a match exists, the logic 132 may determine to wirelessly retransmit the message so that it can be received by other nodes within direct communication range of the node 24.

However, assume that the node 24 receives a message that does not include a route identifier matching any of the route identifiers in its route ID table, thereby indicating that the message is being communicating by a route of which the node 24 is not a member. In such case, the logic 132 may be configured to disregard the message or, in other words, discard the message without retransmitting it.

Figure 3:
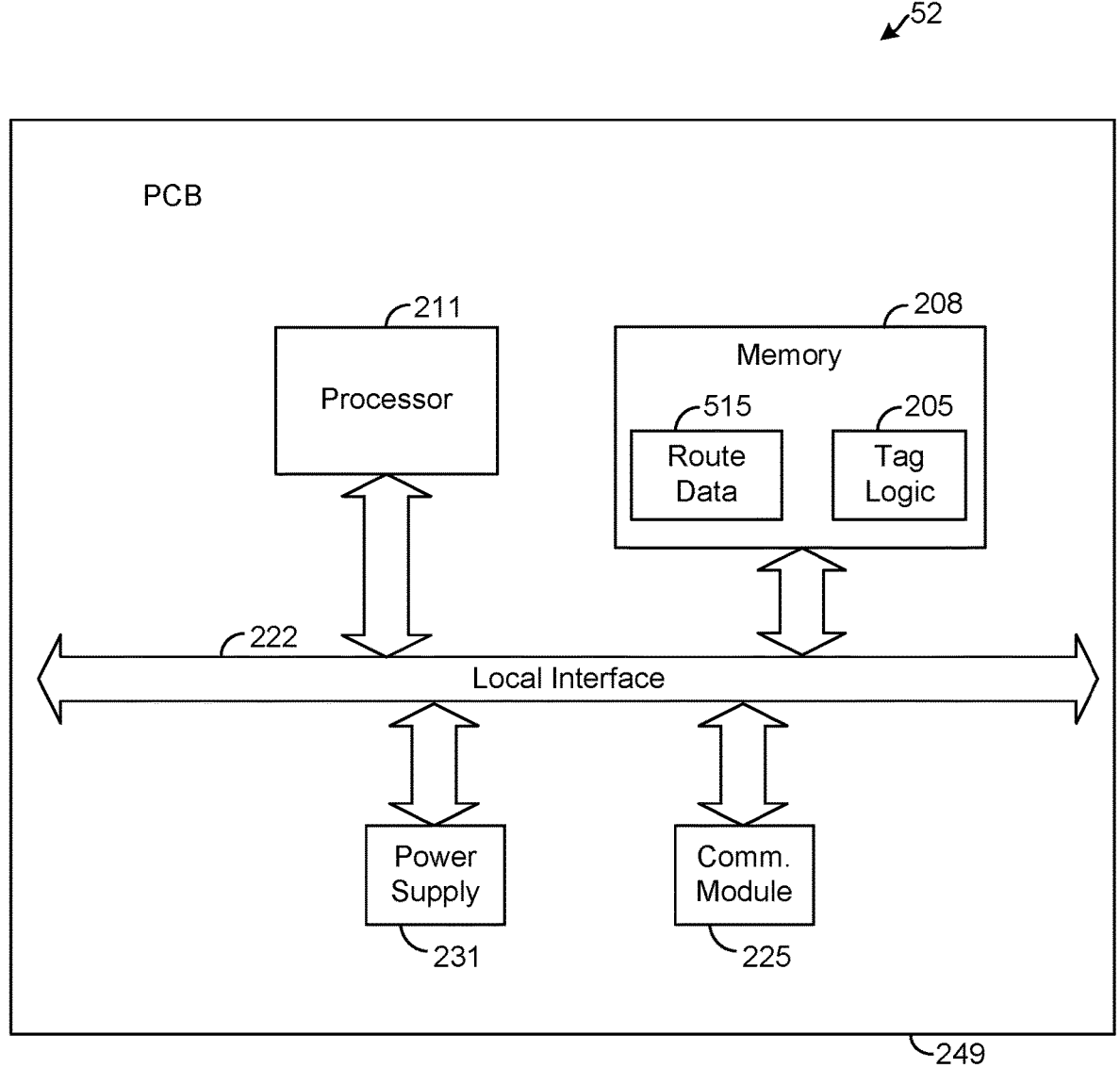
FIG. 3 is a block diagram illustrating an exemplary embodiment of a tag, such as is depicted by FIG. 1.

FIG. 3 depicts an exemplary embodiment of a tag 52. As shown by FIG. 3, the tag 52 comprises logic 205, referred to herein as "tag logic," for generally controlling the operation of the tag 52, as will be described in more detail hereafter. The tag logic 205 can be implemented in software, hardware, firmware or any combination thereof. In the exemplary tag 52 illustrated by FIG. 3, the tag logic 205 is implemented in software and stored in memory 208 of the tag 52. Note that the tag logic 205, when implemented in software, can be stored and transported on any computer-readable medium for use by or in connection with an instruction execution apparatus that can fetch and execute instructions.

The exemplary tag 52 depicted by FIG. 3 comprises at least one conventional processor 211, which comprises processing hardware for executing instructions stored in memory 208. As an example, the processor 211 may comprise a central processing unit (CPU) or a digital signal processor (DSP). The processor 211 communicates to and drives the other elements within the tag 52 via a local interface 222, which can include at least one bus. In addition, the tag 52 has a communication module 225, which comprises an RF radio or other device for communicating wirelessly. The tag 52 also has a power supply 231, such as one or more batteries, which provide electrical power to the components of the tag 52.

The tag logic 205 may be configured to transmit a tag status message to the server 46 via the communication module 225 from time-to-time. The tag status message includes various information about the tag 52. In one exemplary embodiment, the tag status message includes an identifier unique to the tag 52, referred to herein as "tag identifier," which may be the network address of the tag 52 in the WSN 20. The tag status may also include information indicative of the location of the tag that the server 46 uses to track the tag's location. Exemplary techniques for tracking tags are described in U.S. Pat. No. 9,619,989, entitled "Asset Tracking Systems and Methods," which is incorporated herein by reference.

The tag logic 205, like the routing nodes 21-27 may be configured to join the network 20 and select a gateway for network communication and a coordinator for coordinating one or more routes for the tag 52. In this regard, the tag 52 may communicate with the gateway 33 and coordinator 38, as described above for the routing node 24, in order to select the gateway 33 and the coordinator 38, which may assign the tag 52 to a route for use in communicating messages. Note that, in some embodiments, the tag 52 is not configured to perform routing functions, where the tag 52 would otherwise serve as an intermediate hop for messages communicated by the nodes 21-24, so that the tag 52 can go to sleep from time-to-time without affecting the routes used by the other nodes 21-24, as described above. Further, as the tag 52 moves, it may move closer to another gateway, such as gateway 34, and thus select the new gateway 34 for network communication. In such case, the coordinator 39 may assume the responsibility of coordinating a route for the tag 52 and reassign the tag 52 to a different route that passes through the gateway 34 instead of the gateway 33.

Figure 4:
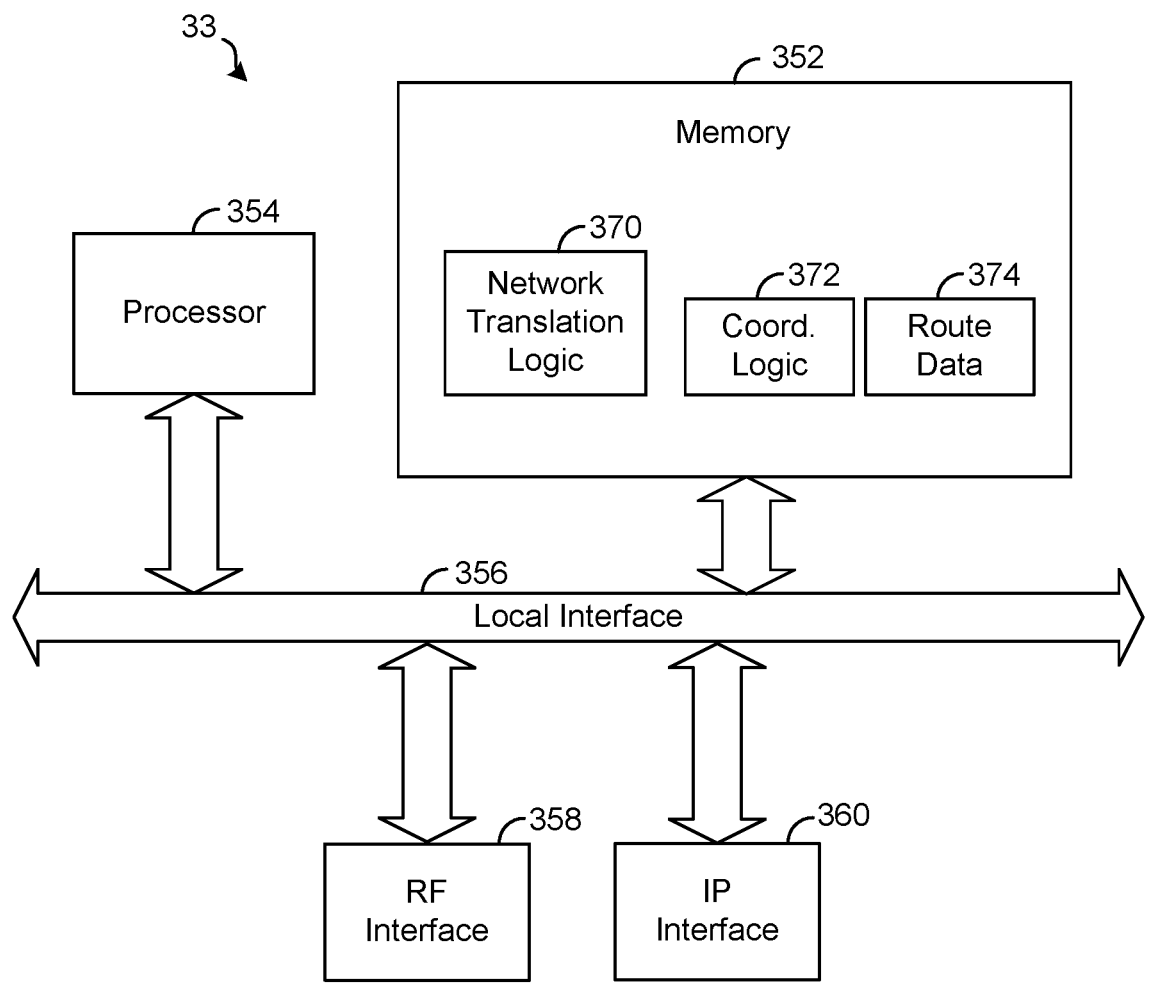
FIG. 4 is a block diagram illustrating an exemplary embodiment of a gateway, such as is depicted by FIG. 1.

FIG. 4 depicts an exemplary embodiment of one of the gateways 33. The exemplary embodiment of the gateway 33 depicted by FIG. 4 includes at least one conventional processor 354, which comprises processing hardware for executing instructions stored in the memory 352. As an example, the processor 354 may comprise a central processing unit (CPU) or a digital signal processor (DSP). The processor 354 communicates to and drives the other elements within the gateway 33 via a local interface 356, which can include at least one bus. Note that any of the other gateways 33-34 may be configured similarly to or identically to the gateway 33 depicted by FIG. 4.

RF interface 358 may include various components and be configured to receive and send messages using RF protocol, such as from WSN 20 or other network. IP interface 360 can receive and send messages using IP protocol, and may include various components configured to exchange messages with various types of networks, including network 36, various packet networks or otherwise. The RF interface 358 and IP interface 360 are shown as separate components of the gateway 33, but in some embodiments, they may be combined, may share hardware, or various resources of the gateway 33 may share functionality ascribed to either of the RF interface 358 and IP interface 360.

Network translation logic 370 can include instructions for translating messages exchanged between a mesh network (e.g., WSN 20) and other types of networks (e.g., network 36). The network translation logic 370 may be configured to modify addresses or other aspects of messages (e.g., packets) received from a network using a first messaging protocol, for transmission through a network using a second messaging protocol. For example, the logic 370 may be configured to enable nodes of WSN 20 to communicate with network 36 (and vice versa) by translating messages of WSN 20 from the messaging protocol of mesh network to IP messaging protocol (or other type of protocol used by the network 36). The logic 370 may be configured to perform other operations in order to achieve the functionality described herein.

The embodiment of the gateway 33 shown in FIG. 4 includes coordinator logic 372, which is implemented in software and stored in memory 352 of gateway 33. In some embodiments, the coordinator logic 372 can be implemented in either hardware or software or various combinations thereof. In the embodiment depicted by FIG. 4, the coordinator 38 is integrated with the gateway 33 such that the coordinator 38 shares hardware resources of the gateway 33. As an example, instructions from both the network translation logic 370 and the coordinator logic 372 may be executed by the processor 354. In other embodiments, network translation logic 370 and the coordinator logic 372 may run on separate processors, and in yet other embodiments, the coordinator 38 can be a standalone, separate component of the system 15 or may be housed in one or more other components of the system 15. As an example, the system 15 may have a single coordinator implemented by or at the server 46 for managing the routes of all of the nodes 21-27 of the network 20. Yet other configurations and locations of the coordinator or coordinators are possible in other embodiments.

The coordinator logic 372 may perform various functions ascribed to a coordinator herein and, specifically, may be configured to discover network topology and handle route assignment and maintenance. In some embodiments, the logic 372 is configured to assign nodes to routes of network 20. The routes are defined based on network topology, which may be stored in memory 352 as route data 374. As an example, route selection for any given node may be based on hop count to reach a point in the network 20, such as gateway 33, and link quality of the possible hops.

For example, assume that the coordinator logic 372 is attempting to select a route for the routing node 24 to reach the gateway 33. In such an example, the coordinator logic 372 may determine that a route from node 24, to node 23, to node 22, and to gateway 33 is an optimal route since it has the fewest number of hops to reach the gateway 33. In such an example, the coordinator logic 372 may communicate with the routing node 24 to assign the node 24 to the foregoing route. That is, the coordinator logic 372 may transmit the route identifier of such route to the node 24, which then stores such route identifier in its route ID table. The coordinator logic 372 may similarly transmit the same route identifier to the nodes 22 and 23, thereby assigning these nodes to the same route.

Note that these assignments of nodes 22 and 23 may occur before or after the assignment of node 24 to the route. As an example, it is possible for the route to exist from node 23 to gateway 33 before the node 24 joins the network or is assigned to the route. After the nodes 22-24 have been assigned to the route, as described above, the routing node 24 may transmit a message to the gateway 33 (e.g., a message destined for the server 46) by including the route identifier of the foregoing route in the message. For such message, each routing node 22, 23 that is a member of the route should retransmit the message so that the message is communicated from the node 24 to the gateway 33, which may then transmit the message to the server 46 or otherwise process the message as appropriate. However, notably, the node 21 (which is not a member of the route in this example) discards the message without retransmitting it, assuming that the message is received by the node 21 when it is retransmitted by node 22 or 23. Thus, the message should follow a defined path through the network 24 to the gateway 33.

In another example, assume that the link quality for the link between the nodes 22, 23 is poor (e.g., below a predefined threshold suggesting that the link is unreliable). In such case, the coordinator logic 372 may instead determine that the most optimal route is one that extends from the node 24, to the node 23, to the node 21, to the node 22, and to the gateway 33. In such case, the coordinator logic 372 may assign the routing node 21 to the route. In addition, as network conditions change (e.g., as nodes join or leave the network 20 or as link quality changes), the coordinator logic 372 may change the routes or reassign nodes to new or different routes in order to accommodate the changes in an optimal manner. In this regard, the coordinator logic 372 may poll the nodes from time-to-time to learn of network topology changes and reassess the routing within the network 20 based on the topology changes, as described further herein.

Note that any node can be a member of more than one route in route data 374. For example, a node that is closer to gateway 33 may be a common point in a plurality of routes beginning at the gateway 33: that is, the node may be located upstream of a plurality of nodes that are members of different routes. Thus, each of those routes may pass through the node. Nodes that are further from the gateway 33 may be members of fewer routes because they are between fewer nodes and the gateway 33.

As described above, the coordinator 38 can from time-to-time poll nodes of the sub-network 28 for which it is responsible for coordinating routes. When the coordinator 38 fails to receive a response to a polling message from a node of the sub-network 28, the coordinator 38 may determine that node has left the network 20 or no longer is able to communicate with the gateway 33 and coordinator 38. In response, the coordinator 38 (e.g., logic 372) may update network topology and link quality information stored in route data 374 (e.g., remove the non-responsive node from the network topology). The logic 372 may also redefine the routes in order to account for the non-responsive node. As an example, the logic 372 may assign one or more other nodes to a route previously assigned to the non-responsive node so that a message on such route can reach the gateway 33 or other point without the presence of the non-responsive node. In another example, the logic 372 may create one or more new routes in response to a determination that the non-responsive node has failed to respond to a polling message. Yet other actions are possible in other examples.

Various examples of the above functionality are provided herein for clarity and further explanation, but embodiments of the present disclosure are not limited to the particular examples discussed herein. Referring to FIG. 1, each coordinator 38, 39 may poll the various nodes of their respective sub-networks 28, 29 and receive responses to the polling messages from their respective nodes 21-24, 25-27. Each coordinator 33, 34 may determine the topology of its respective sub-network 28, 29. In some embodiments, the coordinators 33, 34 may share information regarding topology and link quality for their respective sub-networks 28, 29 so that each coordinator 38, 39 has a complete view of the entire network 20. The coordinators 33, 34 may determine routes for messaging with each of the nodes in their respective sub-networks 28, 29, and may assign a route identifier to the various routes. The coordinators 33, 34 may communicate with the nodes of their respective sub-network 28, 29 to inform each node of the route identifiers of the routes to which the respective node is assigned. In this regard, the nodes 21-27 may know which routes they have been assigned to, and each node 21-27 can store the route identifiers of the routes to which it is assigned in its route ID table, which may be used to determine when to retransmit message, as described above.

The coordinator 38 may be configured to identify and select routes based on various information about number of hops and link quality between a destination node and gateway 33. In some embodiments, the coordinator 38 may prioritize link quality over hop count. In this regard, the coordinator 38 may select a route having a higher link quality even if another route has fewer hops. For example, assume that a first route has a first number of hops between a given node 21-24 and gateway 33 and at least one of the hops has a link quality below a threshold. Also assume that a second route has a second number of hops between the same node and gateway 33 but that a number of hops that has a link quality below a threshold is less than the number for the first route. Assume further that the second number of hops is more than the first number of hops. The coordinator 38 may be configured to select the second route for the node because, although there are fewer hops between the node and gateway 33 when the first route is followed, the second route has a better overall link quality, increasing messaging reliability.

Alternatively, the coordinator 38 may be configured to select the route having the shortest number of hops instead of the route having better link quality. There are various other techniques that the coordinator 38 can use to define the routes in an optimal manner.

The coordinator 38 may be configured to update routes in route data 374 from time-to-time, such as when a node joins or leaves the network 20. The coordinator logic 372 can use responses from polling messages to maintain the routes by dynamically assigning nodes to routes based on monitoring of the network topology and link quality of a route. For example, polling of nodes may reveal unresponsive nodes, nodes that have recently joined the network 20, or changes in the quality of links between the nodes. Based on responses to the polling messages, the coordinator logic 372 can update the route data 374 and communicate changes to the route data 374 to the nodes. By using one or more coordinators to maintain the routes and dynamically assign nodes to routes, the system 15 may have routes that are "self-healing".

Note that the coordinator 38 may determine when a node changes locations and may also determine that routes used by the node should be updated using similar techniques to the route discovery and maintenance functions described above. For example, a coordinator 38 may comprise various instructions (e.g., coordinator logic 372) for tracking tags 52 as they move through an environment covered by the network (e.g., WSN 20) and determining whether a new route would be more efficient for communicating with the tag 52.

As an example, assume that the routing node 23 and the routing node 22 are both assigned to a first route identified by a first route identifier. Based on responses to polling messages, the coordinator 38 may determine that the tag 52 is a neighbor (i.e., within one hop) of routing node 23. In such case, the coordinator 38 may assign the tag 52 to the route identified by the first identifier. Thus, when the tag 52 desires to send a message to the gateway 33 (e.g., a message destined for server 46 or other location) the tag 52 may include the first identifier in the message such that the message is retransmitted by the routing nodes 22, 23 and, thus, is received by the gateway 33.

However, assume that the tag 52 moves to within one hop of the routing node 21, and also assume that both routing nodes 21, 22 have been assigned to a route identified by a second route identifier. In such case, the coordinator 38 may reassign the tag to the route identified by the second route identifier. Thus, when the tag 52 desires to send a message to the gateway 33 (e.g., a message destined for server 46 or other location) the tag 52 may include the second identifier in the message such that the message is retransmitted by the routing nodes 21, 22 and, thus, is received by the gateway 33.

One or more coordinators 38, 39 may further be configured to synchronize route identifiers and route information among other coordinators. In this regard, one coordinator may share information with another coordinator so that the two coordinators do not attempt to assign the same route identifier for different routes. In this regard, it is possible for at least some nodes of sub-network 28 to be within direct communication range for one or more nodes of sub-network 29 and having the same route identifier for different routes can result in the needless retransmission of at least some messages, thereby increasing network congestion.

Synchronization of route and route identifier data among the coordinators 38, 39 may be performed using various techniques, such as by providing information about route identifiers used by a first coordinator to the other coordinators, which may then be configured to refrain from using route identifiers received from the first coordinator. Moreover, each coordinator may be configured to share its route identifiers with any or all of the other coordinators. In other embodiments, one of the coordinators, referred to hereafter as the "synchronization coordinator," may be configured to allocate route identifiers to the other coordinators. Thus, when any coordinator needs a new route identifier, it may request a new route identifier from the synchronization coordinator, which then responds to the request by allocating a route identifier not in use by the other coordinators. The synchronization coordinator may communicate the newly allocated route identifier to the coordinator that requested it for us by such requesting coordinator. In other embodiments, yet other techniques for synchronizing route identifiers among the coordinators are possible.

Figure 5:
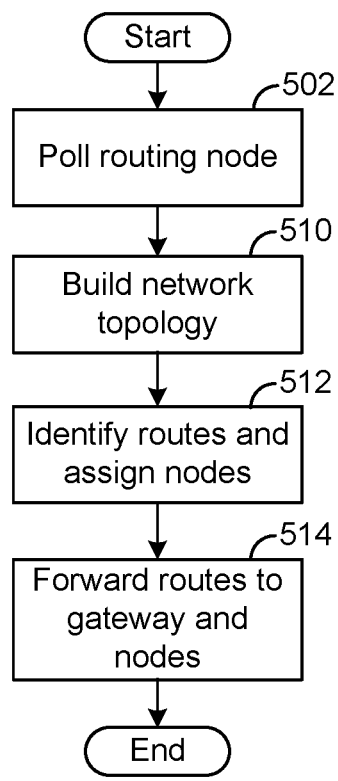
FIG. 5 is a flowchart depicting an exemplary method for establishing routes in a network, such as is depicted by FIG. 1.

FIG. 5 is a flowchart depicting an exemplary method for establishing routes in a network, such as is depicted by FIG. 1. At step 502, the coordinator 38 may poll routing nodes. As an example, the coordinator 38 may send a polling message to the routing node 22. In response to the polling message, the routing node 22 may send a one-hop multicast message that is received by the nodes 21, 23 in direct communication range of the node 22. In response to the one-hop multicast message, each node 21, 23 may transmit a reply that includes the network identifier of the respective node 21, 23 and a value indicative of the received signal strength of the one-hop multicast message. The routing node 22 may provide the network addresses of the nodes 21, 23 and the link quality information received from the nodes 21, 23 to the coordinator 38 as a reply to the polling message. The coordinator 38 may then repeat the aforementioned process for the nodes 21, 23. By performing this process, the coordinator 38 may build a topology of the sub-network 28 at step 510 of FIG. 5. After the coordinator 38 has built a topology for the sub-network 28, processing may proceed to step 512.

At step 512, the coordinator 38 may be configured to use the network topology to identify routes from the gateway 33 to the nodes 21-24 of the sub-network 28. The coordinator 38 may do so based on a number of hops between the gateway 33 and each node 21-24, as well as link quality information. Thereafter, processing may proceed to step 514, where the coordinator 38 may forward route identifiers to the nodes assigned to such routes. After the coordinator 38 has forwarded the route identifiers and routing tables to the nodes on each route, processing may end. Thereafter, the nodes 21-24 are configured to forward messages along routes based on the routes to which they have been assigned, as described above. In addition, as also discussed above, the coordinator 38 from time-to-time may poll the nodes 21-24 to discover changes to the network topology and adjust the routes as may be desired to account for such changes. In addition, the coordinator 39 may be configured to similarly define and update routes for the nodes 25-27 of sub-network 29.

In various embodiments described above, tags 52 are described as being assigned to routes by a coordinator 38, 39, similar to the routing nodes 21-27. However, in some embodiments, tags 52 may be assigned to routes through different techniques, such as by communicating with one or more routing nodes 21-27 to learn of route identifiers used by the routing nodes 21-27. An exemplary process of assigning a tag 52 to a route will be described in more detail below.

As indicated above, a tag 52 from time-to-time may temporarily transition to a sleep state in order to conserve power. When a tag 52 awakens from a sleep state (or at other times when discovering a new route to a gateway or other point is desired), the tag 52 may broadcast a message to at least one routing node 21-27, such as one or more routing nodes 21-27 that are within the direct communication range of the tag 52 in order to learn a route that the tag 52 may use for communication. As an example, in one embodiment, the tag 52 may transmit a one-hop multicast message (or other type of message) that is heard by routing nodes within the transmission range of the tag 52. For illustrative purposes, assume that the routing nodes 21, 23 are within the transmission range of the tag 52 such that they both hear the one-hop multicast message. In response, each of the routing nodes 21, 23 that hear the one-hop multicast message respond by transmitting a reply that is heard by the tag 52. Such reply may include various information for enabling the tag 52 to identify and select a route to be used for communication by the tag 52.

As an example, in one embodiment, the reply from a routing node 21, 23 may include one or more route identifiers identifying one or more routes to which the routing node 21, 23 is assigned. In this regard, the routing node 21, 23 responding to the one-hop multicast message from the tag 52 may transmit a reply that includes one or more route identifiers from the its route ID table. In some embodiments, the reply may also include link quality information (e.g., the received signal strength measured for the one-hop multicast message from the tag 52) indicative of the link quality between the routing node 21, 23 and the tag 52. The reply also may include the number of hops between the routing node 21, 23 that is transmitting the reply and its respective gateway 33 or other point in the network.

Based on the information in the replies received from routing nodes 21, 23 that respond to the one-hop multicast message, the tag 52 may select at least one route identifier for use in communicating with the gateway 33 or other component of the system such that the tag 52 is assigned to the identified route for communication. Note that the selection may be based on any of several factors, such as link quality and hop count. For example, if the link quality between the tag 52 and the routing node 21 is significantly better than the link quality between the tag 52 and the routing node 23, then the tag 52 may select a route identifier received from the routing node 21 identifying a route to which the routing node 21 is assigned. However, if the two links have about the same or similar quality, then the tag 52 may select a route identifier from the routing node 21 or 23 having the shortest hop count to the gateway 33 or other point in the system. In other embodiments, other techniques for selecting route identifiers from the routing nodes 21, 23 are possible.

After selecting a route identifier, as described above, the tag 52 may transmit a message that includes the selected route identifier. The routing nodes assigned to the identified route should retransmit the message such that it propagates through the sub-network 28 to the gateway 33. Based on information in the message, the gateway 33 may learn of the tag's assignment to the identified route. In this regard, the gateway 33 may correlate the route identifier from the message with the network address of the tag 52 (as indicated by the message's source address) so that the gateway 33 is aware of how to communicate with the tag 52. In this regard, if the gateway 33 desires to communicate with the tag (e.g., send a software update or other information), the gateway 33 may use the route identifier of the last message received from the tag 52. That is, the gateway 33 may insert such route identifier into the message so that routing nodes assigned to the identified route retransmit the message and propagate the message through the sub-network 28 to the tag 52. If desired, the tag 52 may perform the same route discovery process each time that it awakens from a sleep state so that the tag 52 can find an optimal route to a gateway even if it is moved to a new location while in the sleep state. The tag 52 may also perform such route discovery process as may be desired, such as periodically or in response to movement of the tag 52, regardless of whether or when the tag 52 transitions to a sleep state. In other embodiments, other techniques for finding routes through the network by a tag 52 are possible.

Various examples are provided herein in an effort to convey a clear understanding of the subject matter described in this application. Various changes or modifications to the described examples would be apparent to a person of ordinary skill upon reading this disclosure.

Now, therefore, the following is claimed:

1. An asset tracking system, comprising:
a wireless mesh network having a plurality of nodes, including at least a first node and a second node;
a tag;
a server configured to track the tag based on messages communicated by the wireless mesh network; and
a coordinator configured to determine a topology of the wireless mesh network and, based on the topology, define a plurality of routes through the wireless mesh network, including at least a first route and a second route, wherein for each of the plurality of routes the coordinator is configured to assign to the respective route each of the plurality of nodes through which the respective route passes, wherein the coordinator is configured to assign at least the first node and the second node to the first route by transmitting a first route identifier identifying the first route to the first node and the second node,
wherein one of the plurality of nodes is configured to transmit a unicast message having the first route identifier identifying the first route, wherein each of the plurality of nodes receiving the unicast message is configured to (1) determine whether to retransmit the unicast message through the wireless mesh network based on the first route identifier in the unicast message by comparing the first route identifier in the unicast message to route identifiers of routes assigned to the respective node by the coordinator and (2) wirelessly retransmit the unicast message through the wireless mesh network in response to the first route identifier in the unicast message if the first route identifier in the unicast message corresponds to one of the route identifiers of routes assigned by the coordinator to the respective node receiving the message, and wherein each of the first node and the second node is configured to receive the unicast message as the unicast message propagates along the first route and forward the unicast message in response to the first route identifier in the unicast message.

2. The system of claim 1, further comprising:
a second network; and
a gateway configured to receive a plurality of messages from the wireless mesh network and to convert each of the plurality of messages into a format compatible with the second network, the gateway further configured to transmit each of the plurality of messages to the server through the second network, wherein the first route identified by the first route identifier passes through the gateway.

3. The system of claim 2, wherein the coordinator is configured to assign the one of the nodes to the first route based on a number of hops from the one of the nodes to the gateway along the identified route.

4. The system of claim 3, wherein the coordinator is configured to communicate with the nodes to determine link quality information for links between the nodes, and wherein the coordinator is configured to assign the one of the nodes to the identified first route based on the link quality information.

5. The system of claim 2, wherein the coordinator is coupled to the gateway.

6. The system of claim 2, wherein the coordinator is integrated with the gateway.

7. The system of claim 1, wherein the coordinator is configured to transmit the first route identifier to each of the nodes assigned to the identified first route.

8. The system of claim 1, wherein the first node has a first route identifier table storing route identifiers identifying routes to which the first node is assigned, wherein the first node is configured to store the first route identifier from the coordinator in the first route identifier table, wherein the second node has a second route identifier table storing route identifier identifying routes to which the second node is assigned, and wherein the second node is configured to store the first route identifier from the coordinator in the second route identifier table.

9. The system of claim 8, wherein the first node is configured to store the first route identifier to the first route identifier table without storing a next hop address for the first route in the route identifier table.

10. The system of claim 1, wherein the first node and the second node are configured to forward the message without inserting a next hop address in the message.

11. The system of claim 1, wherein the first node is configured to determine whether the first node is a member of the first route for the unicast message based on the first route identifier in the unicast message, and wherein the second node is configured to determine whether the second node is a member of the first route for the unicast message based on the first route identifier in the unicast message.

12. A wireless mesh network, comprising:
a plurality of nodes, including at least a first node and a second node; and
a coordinator configured to determine a topology of the wireless mesh network and, based on the topology, define a plurality of routes through the wireless mesh network,
wherein the plurality of routes include at least a first route and a second route, wherein for each of the routes the coordinator is configured to assign to the respective route each of the plurality of nodes through which the respective route passes, wherein the coordinator is configured to transmit a first route identifier identifying the first route to each of the plurality of nodes assigned to the first route, including at least the first node and the second node, and to transmit a second route identifier identifying the second route to each of the plurality of nodes assigned to the second route, wherein one of the nodes assigned to the first route is configured to receive a unicast message and to determine whether the unicast message includes the first route identifier, and wherein the one of the nodes is further configured to retransmit the unicast message in response to a determination that the unicast message includes the first route identifier, and wherein each of the first node and the second node is configured to forward the unicast message in response to the first route identifier in the unicast message.

13. The wireless mesh network of claim 12, wherein a tag is configured to communicate with one of the nodes to learn the first route identifier.

14. The wireless mesh network of claim 12, wherein a tag is configured to transmit a multicast message after awakening from a sleep state, to receive replies to the multicast message from the nodes, to select a route identifier from the replies, and to transmit a message through the wireless mesh network using the selected route identifier.

15. The wireless mesh network of claim 12, further comprising:
a second network; and
a gateway configured to receive a plurality of messages from the nodes and to convert each of the plurality of messages into a format compatible with the second network, the gateway further configured to transmit each of the plurality of messages to a server through the second network, wherein the first route identified by the first route identifier passes through the gateway.

16. The wireless mesh network of claim 15, wherein the coordinator is configured to assign the one of the nodes to the first route based on a number of hops from the one of the nodes to the gateway along the first route.

17. The wireless mesh network of claim 16, wherein the coordinator is configured to communicate with the nodes to determine link quality information for links between the nodes, and wherein the coordinator is configured to assign the one of the nodes to the identified route based on the link quality information.

18. The wireless mesh network of claim 15, wherein the coordinator is coupled to the gateway.

19. The wireless mesh network of claim 15, wherein the coordinator is integrated with the gateway.

20. A method for use in a wireless mesh network, comprising:
determining a topology of the wireless mesh network, including at least a first node and a second node;
defining, by a coordinator, a plurality of routes through the wireless mesh network based on the determined topology, wherein the plurality of routes include at least a first route and a second route;
assigning, by the coordinator, to the first route each of the nodes through which the first route passes including at least the first node and the second node;
assigning, by the coordinator, to the second route each of the nodes through which the second route passes;
transmitting a first route identifier identifying the first route from the coordinator to each of the nodes through which the first route passes;
transmitting a second route identifier identifying the second route from the coordinator to each of the nodes through which the second route passes;
receiving a first unicast message at one of the nodes assigned to the first route;
determining at the one of the nodes whether the first unicast message includes the first route identifier; and
retransmitting the first unicast message from the one of the nodes in response to a determination that the first unicast message includes the first route identifier, and wherein each of the first node and the second node is configured to forward the first unicast message in response to the first route identifier in the first unicast message.

21. The method of claim 20, further comprising:
transmitting a multicast message from a tag;
receiving, at the tag, replies to the multicast message from the nodes;
selecting a route identifier from the replies; and
transmitting a second unicast message through the wireless mesh network from the tag using the selected route identifier such that the second unicast message propagates along a route identified by the selected route identifier.

22. The method of claim 20, further comprising:
receiving a plurality of messages from the nodes at a gateway;
converting, at the gateway, each of the plurality of messages into a format compatible with a second network; and
transmitting the plurality of messages from the gateway through the second network,
wherein the first route identified by the first route identifier passes through the gateway.

23. The method of claim 22, wherein the assigning to the first route comprises assigning the one of the nodes to the first route based on a number of hops from the one of the nodes to the gateway along the first route.

24. The method of claim 22, wherein the assigning to the first route comprises assigning the one of the nodes to the first route based on a link quality between the one of the nodes and another of the nodes along the first route.

25. A method for use in a wireless mesh network, comprising:
determining a topology of the wireless mesh network, including at least a first node and a second node;
defining, by a coordinator, a plurality of routes through the wireless mesh network based on the determined topology, wherein the plurality of routes include at least a first route and a second route;
assigning to the first route by the coordinator each of the nodes through which the first route passes including at least the first node and the second node;
transmitting a first route identifier identifying the first route from the coordinator to each of the nodes through which the first route passes;
receiving a unicast message at the first node, the unicast message including the first route identifier;
comparing, at the first node, the first route identifier in the first unicast message to route identifiers of routes assigned to the first node by the coordinator;
determining, at the first node, whether to retransmit the unicast message through the wireless mesh network based on the first route identifier in the unicast message;
wirelessly retransmitting the unicast message through the wireless mesh network by the first node if the first route identifier in the unicast message corresponds to one of the route identifiers of routes assigned by the coordinator to the first node;
receiving the unicast message at the second node;
comparing, at the second node, the first route identifier in the first unicast message to route identifiers of routes assigned to the second node by the coordinator;
determining, at the second node, whether to retransmit the unicast message through the wireless mesh network based on the first route identifier in the unicast message; and
wirelessly retransmitting the unicast message through the wireless mesh network by the second node if the first route identifier in the unicast message corresponds to one of the route identifiers of routes assigned by the coordinator to the second node.

* * * * *